United States Patent [19]
Trent et al.

[11] 3,986,750
[45] Oct. 19, 1976

[54] MICRO-NUT AND SENSORY MOUNTING ARRANGEMENT

[76] Inventors: Roy T. Trent, 240 S. Gramercy Place, Los Angeles, Calif. 90004; Vance L. Trent, 12130 Old River School Road, Downey, Calif. 90242

[22] Filed: Jan. 20, 1975

[21] Appl. No.: 542,442

[52] U.S. Cl. ............................................ 301/9 CN
[51] Int. Cl.² ............................................ B60T 8/08
[58] Field of Search ............ 151/28; 85/62; 73/128; 301/5 R, 9 CN, 124 R; 188/1 R, 181 R, 181 A; 340/52 R, 65; 310/68 K, 68 A, 168; 303/21 A, 21 CF

[56] References Cited
UNITED STATES PATENTS

| | | | |
|---|---|---|---|
| 2,906,558 | 9/1959 | Forbush | 301/9 CN |
| 3,298,223 | 1/1967 | Dyer | 301/5 R |
| 3,630,578 | 12/1971 | Kaiser | 303/21 A |
| 3,762,455 | 10/1973 | Anderson | 151/28 |
| 3,827,289 | 8/1974 | Borg | 73/118 |
| 3,910,386 | 10/1975 | Stigall | 303/21 CF |

*Primary Examiner*—Stanley H. Tollberg
*Attorney, Agent, or Firm*—Whann & McManigal

[57] ABSTRACT

A combination of parts cooperating with a wheel supported on a shaft by bearings in which there is a lock nut threaded on said shaft into a position for accurate adjustment of the bearing means of the wheel in combination with a lock ring for locking said nut in an accurate position and in combination with accurately formed retaining and mounting ring whereby a sensor for sensing the action of a wheel under braking conditions can be mounted on said nut in a position adjacent to the end of the shaft with the sensor being concentric and axially aligned.

5 Claims, 9 Drawing Figures

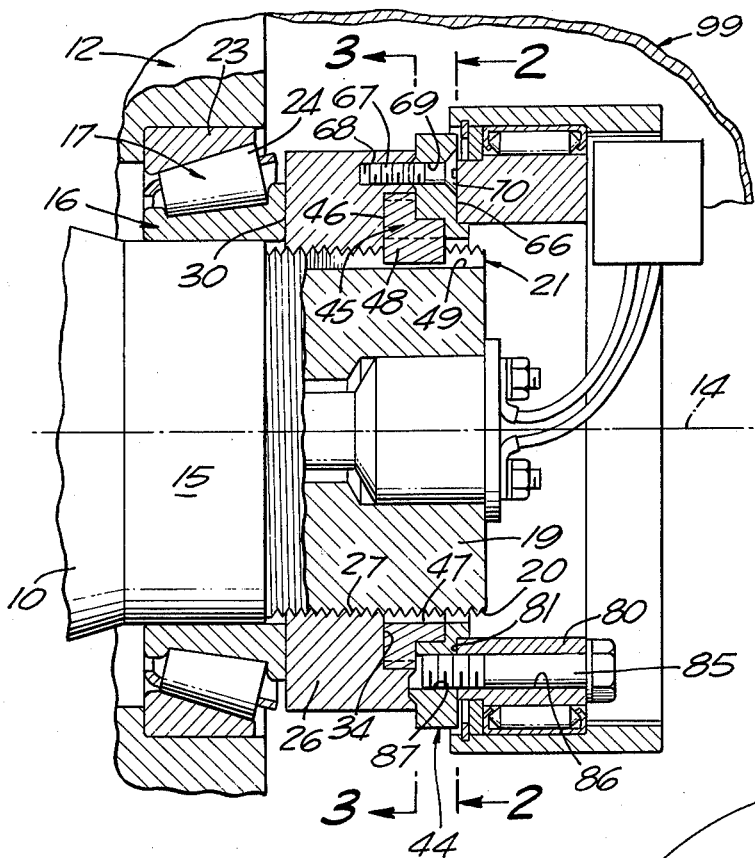
FIG. 1.
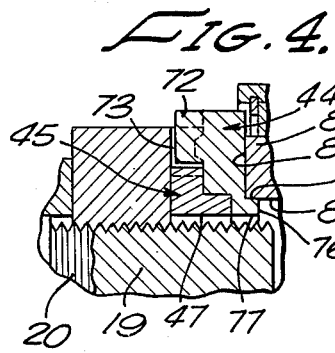
FIG. 4.
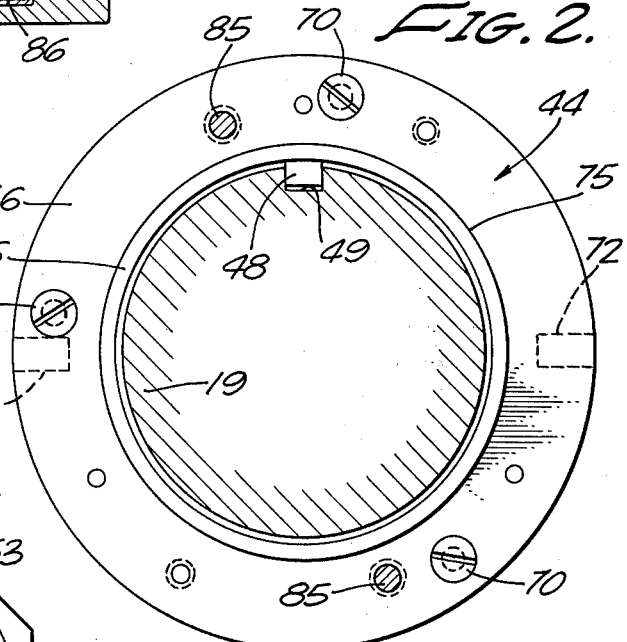
FIG. 2.
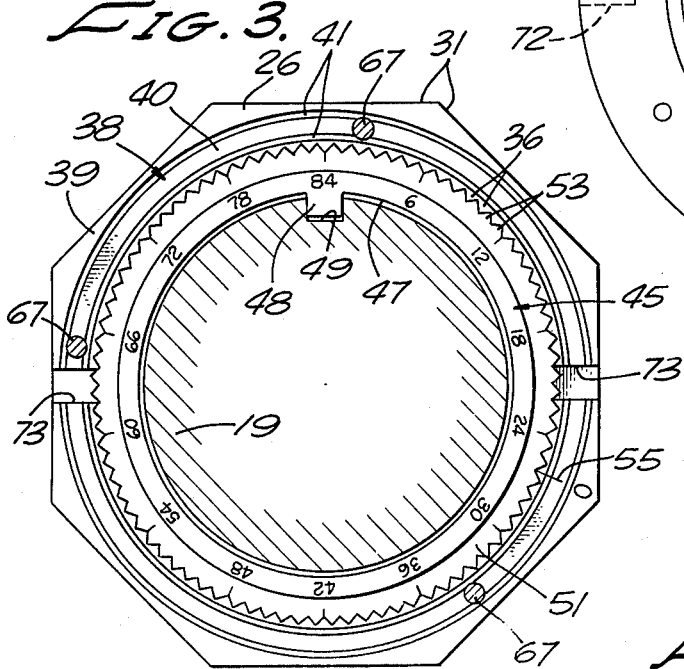
FIG. 3.
FIG. 5.

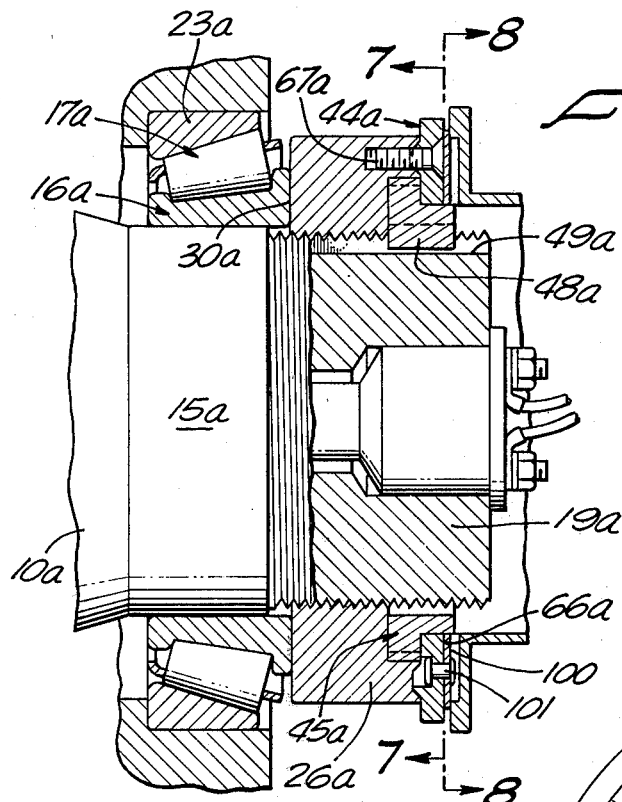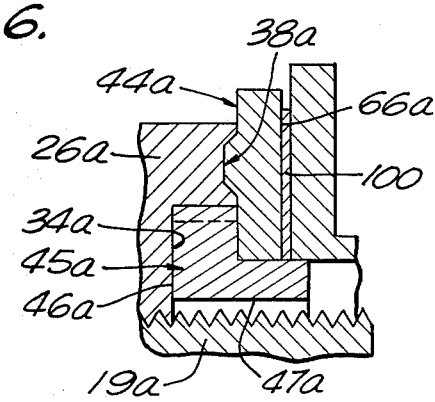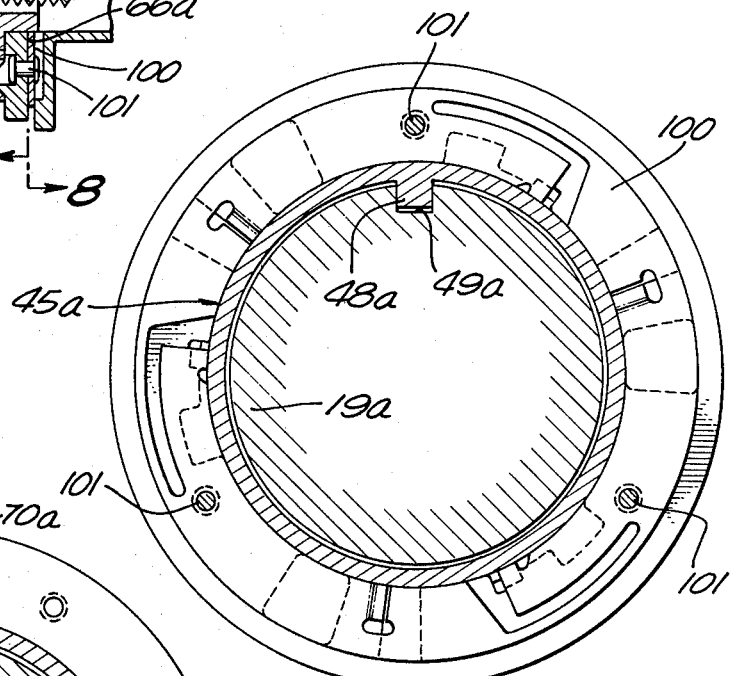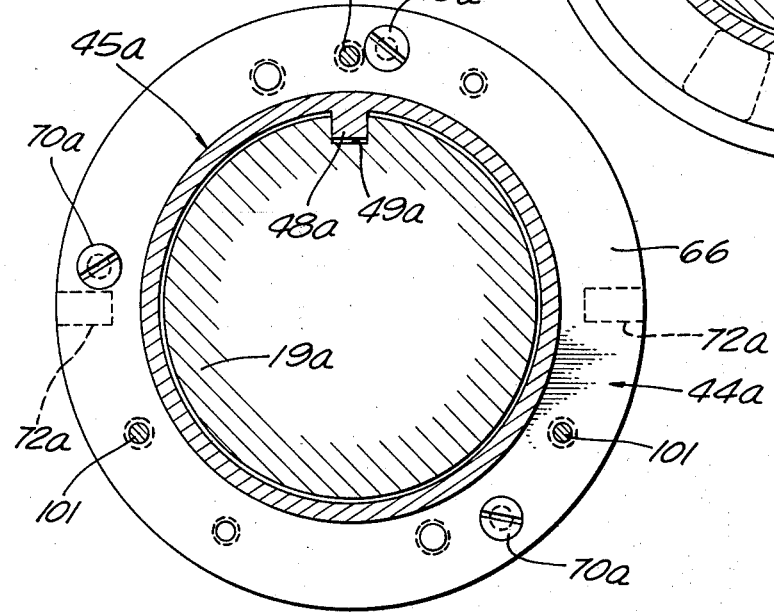

MICRO-NUT AND SENSORY MOUNTING ARRANGEMENT

BACKGROUND OF THE INVENTION

Our invention is of utility in any installation of wheel and shaft where bearings must be accurately adjusted to prevent brinelling and where sensor mounting means is required. One important use of our invention is in the automotive industry, where the wheel bearings, particularly the wheels, must be accurately adjusted so that the weight transfer or load through the bearing elements or rollers is distributed among substantially all the rollers and not merely one, two or three elements only. When the bearings are too loose there will be a brinelling action which causes indentations which result in failure of the bearing.

Also it has been found that many accidents occur because of the brakes of vehicles, such as trucks and trailers, locking and causing jacknifing, as well as throwing the vehicle out of control. In order to prevent such a disaster the United States Department of Transportation has established regulations requiring drive sensors or anti-skid devices to eliminate the braking defects.

It is old in the art as shown in the patent to Polizzi U.S. Pat. No. 2,365,433, to provide lock nuts using mating teeth, serrations, splines, and in which a cotter hole and cotter pin are employed as the final fastening device. Also it is old to provide a serrated structure as shown in the patent to Anderson, Jr., U.S. Pat. No. 3,762,455. Also, it is old to provide a nut having a lock ring with mating serrations, the lock ring being pushed in a recess in the nut and held in place by a spring clip.

No place in the art is there a structure which permits the use of accurate adjusting means for the nut and at the same time support on the nut for a sensing means, the sensing means being accurately positioned both concentrically and axially.

SUMMARY OF THE INVENTION

It is an object of our invention to provide an arrangement in which a nut is adjustably supported on a shaft and by rotation be axially movable to give the bearing and wheel the correct operating clearance, and in which a sensor is also concentrically mounted on said nut in axial alignment therewith.

The combination of parts of our invention provides a simple arrangement based on the concept of using the nut as the mounting means. The parts are simplified, they can be accurately made to give precise alignments and there is easy access thereto.

It is an object of our invention to provide the combination nut and retainer arrangement wherein the retainer holds the nut locking means in position and also mounts the sensor on the nut.

It is an object of our invention to provide parts which are so designed that the radial and circumferential walls or surfaces are readily machined with great accuracy so that exact alignments of the parts are obtained and optimum conditions achieved.

Other objects and advantages of our invention will be made apparent in the course of the following description of preferred forms of our invention.

BRIEF DESCRIPTION OF THE DRAWINGS

FIG. 1 is a vertical cross-sectional view showing our invention as applied to the axle and wheel of an automotive vehicle;

FIG. 2 is a sectional view taken on the line 2—2 of FIG. 1 in the direction of the arrows;

FIG. 3 is a cross-sectional view taken on the line 3—3 in the direction of the arrows;

FIG. 4 is a fragmentary sectional view showing an aligning lug and the manner in which it aligns the nut and lock ring retainer of our invention;

FIG. 5 is a fragmentary sectional view showing the manner of and means by which the lock ring retainer is held in concentric position with respect to the nut;

FIG. 6 is a vertical sectional view of an alternative form of our invention;

FIG. 7 is a sectional view taken on the line 7—7 of FIG. 6 in the direction of the arrows 7;

FIG. 8 is a sectional view taken along the line 8—8 in the direction of the arrows; and FIG. 9 is a fragmentary sectional view showing the relationship between the nut lock ring, lock ring retainer, and mounting part of the sensor.

DESCRIPTION OF THE PREFERRED EMBODIMENT

Referring to the drawings, and particularly FIGS. 1 to 5, we have illustrated our invention as applied to the front wheels of an automotive vehicle. The numeral 10 represents a shaft or trunion of an automotive vehicle, which supports a rotating wheel 12 which has a braking means (not shown). The shaft is positioned on an axis 14 and has a cylindrical portion 15 for receiving the inner race 16 of a bearing 17. The shaft 10 also has an axially extending threaded portion 19 having threads 20 and also having an axially extending keyway 21.

The bearing 17, which supports the wheel 12, usually along with second bearing, comprises not only the inner race 16, but also an outer race 23, and between the inner and outer races are cone-shaped rollers 24.

Threaded on the threaded end 19 is a nut 26 having an internal threaded bore 27. The nut 26 has a radially extending bearing race engaging a wall 30 and an outer shape, which is usually made in the form of eight sides 31 for the application of a loosening or tightening wrench.

The tightness or the looseness of the wheel 12 or the bearings 17 is determined by the axial position of the nut 26. By rotating the nut 26 in a clockwise direction it moves to the left and tightens the bearing. Also, the bearings and wheel are loosened by rotating the nut in an anticlockwise direction.

The position of the nut 26 is critical because excessive looseness or excessive tightness of even one or two thousandths of an inch is enough to produce harmful results.

The nut 26 has a recess 33 shown enlarged in FIG. 5, which has an annular radial face 34 which is accurately formed on a radial plane and an inwardly facing cylindrical wall 35 having annularly arranged axial serrations 36, which are of a predetermined size and pitch. Also, the nut has an aligning groove 38 formed in the radial wall 39. This groove 38 is formed by a bottom wall 40 and sloping side walls 41. The aligning groove is concentric and symmetric to the axis 14. The bottom wall 40 is radial and the side walls 41 are formed at identical angles with the axis 14.

The function of the aligning groove is to concentrically mount and axially align the lock ring retainer 44, which will be referred to and explained shortly.

Positioned in the recess 33 is a nut lock ring 45 which has a radial wall 46 engaging the recess wall 34, the inner cylindrical wall 47 which surrounds the threaded portion 19 of the shaft and which is provided with an axial key 48 which extends into the keyway 49 of the shaft 10. The ring 45 has an annular portion 50, one side of which aligns with the radial wall 46 and the other side is defined by a radial wall 51. The outer cylindrical portion of the nut lock ring is provided with annularly arranged axially extending serrations 53 which interengage and mesh with the serrations 36.

The function performed by the lock ring is as follows: First, it will be seen that the lock ring must always be positioned on the shaft 10 in a single rotational position because the key 48 must fit in the keyway 49. Also it will be noted that the nut lock ring 45 has a zero point 55. In mounting the wheel 12 on the shaft or in making an adjustment of clearance for the bearings and wheel, all parts are removed except the wheel and the bearings, whereafter the nut 26 is rotated into place and it is rotated to the extent that the radial wall 30 engages the inner race 16 and may apply a pressure to move the inner race into a desired position. The best position for these parts is to have the clearance of the bearing such that the wheel 12 will rotate freely without binding yet there will not be enough clearance to permit the load to be taken by only a few of the rollers 24 which would result in brinelling and bearing damage.

As an example of adjusting the wheel bearings with dual wheels using 10.00 by 22 tires, the procedure may be as follows: The factory usually specifies a bearing clearance of one thousandths of an inch. To obtain this end play and precision adjustment of the bearing a torque wrench is applied to the nut and it is torqued to 180 foot pounds while rotating the wheel. The nut is then backed off to no torque and the torque wrench is again used to reset the torque at 90 foot pounds of torque. The lock ring is then assembled along with the other parts and the bearing is now properly adjusted. The mechanic, having noted before disassembly the relative position of zero mark of nut over the calibration of the lock ring, on reassembly any change of position of zero on nut to a new calibration of the lock ring can be used to compute bearing wear.

The lock ring retainer 44, shown in FIGS. 1, 4 and 5, has a body 60 and an inwardly projecting lip 61. The body has a radial face 62, which engages the radial face 39 of the nut and may also engage the radial face 51 of the nut lock ring 45. Projecting from the radial face 62 is an annular aligning projection 65 which fits snugly in the aligning recess 38. The projection has walls which mate with and engage the walls forming the recess. The projection is arranged so that it is concentric with the axis 14 and the radial face is also in a true radial position. With this arrangement the lock ring retainer 44, which also comprises a mounting ring, is accurately arranged to be concentric with the axis 41 and also has a radial face or surface 66, which is exactly radial with respect to the axis 14. This is essential because this lock ring retainer and mounting ring not only retains the nut lock in place, but also provides a surface or surfaces against which the sensor may be secured so as to be in a very accurate position both concentrically and radially with respect to the shaft 10.

The retainer and mounting ring 44 is held in place by screws 67, which extend into threaded openings 68 in the nut 26 and through cylindrical openings 69 of the retainer end mounting ring 44, the conical heads 70 of the screws being positioned in the conical ends of the openings 69 so as not to interfere with the radial wall 66.

As shown in FIG. 4, the part 44 has an aligning lug 72 fitting into a recess 73 of the nut so that the retainer and mounting ring 44 must also occupy a precise rotational position.

The lip 61 projects rightwardly from the main portion of the ring 44 and has an outer cylindrical wall 75 and a radial end wall 76 and an inner cylindrical portion 77, which aligns with the inner cylindrical wall 47 of the nut retainer 45.

The invention is designed to support various sensors which may be on the market and it has been designed so that the sensors may be mounted on the nut 19, accurately in a concentric axial and radial position.

In the form of the invention shown in FIGS. 1 to 5 the sensor is provided with a mounting body 80 having a radial end wall 81 and an inner cylindrical wall 82, these walls 81 and 82 being exactly radial and exactly cylindrical and engaging corresponding walls 66 and 75 of the mounting ring 44.

The mounting body which forms a part of the sensor is secured in place by the accurately positioned bolts 85 which extend through cylindrical openings 86 and into threaded openings 87 of the lock ring retainer and mounting ring 44.

With this arrangement of parts and with the various surfaces and portions accurately formed so that radial faces and radial cylindrical faces are truly concentric, it will be possible to mount the sensor on the nut 26 so that it will be truly concentric and truly axial so that relative movement other than rotational movement will be held to such a minute minimum that there will be no interference with the proper operation of the sensor. The parts described may be surrounded or enclosed by a cover or cap 99.

In FIGS. 6 to 10 we have shown an alternative form of our invention in which identical parts are given identical numbers followed by the suffix *a*. In this form of the invention the lock ring and mounting ring 44*a* is provided with a quick-acting attaching part or lock plate 100 secured to the radial wall 66*a* by means of rivets 101. The housing of the sensor can be readily attached and detached by relative rotational movement.

We claim:

1. In combination with a means for mounting a rotating part and bearing means on a shaft whereby the rotating part and bearing means may be accurately adjusted and in combination with a sensor for sensing the function of a part related to the rotating part, the combination including:
   a. a shaft on which the rotating part and bearing may be mounted, said shaft having a threaded portion;
   b. a nut on said shaft having threads engageable with the threads on the shaft and having annularly arranged serrations;
   c. removable nut holding means engageable with said shaft so that it may have but one circumferential position and having annularly arranged serrations engageable with the serrations of said nut whereby said nut may be held in a predetermined rotational and axial position and upon removal of the nut holding means, may be moved into different circumferential and axial positions and held in such other positions by replacement of said nut holding means;
d. nut holding retainer and mounting means mounted on said nut for holding said removable nut holding means in holding position with respect to said nut;
e. securing means for securing said removable nut holding and mounting means in a concentric and axially aligned position with respect to said nut and the axis of the shaft on which said parts are mounted; and
f. a sensor mounted on said securing means.

2. A combination as defined in claim 1 in which said removable nut holding means fits into a recess in said nut, in which the serrations are circumferentially arranged thereon to engage serrations in said recess and in which said removable nut holding means is held in a precise circumferential position by an inwardly extending key which extends into an axial keyway formed in said shaft.

3. A combination as defined in claim 1 in which said nut holding retainer and mounting means has an annular projecting lip and in which a mounting body of a sensor is secured against an end face of said nut holding retainer and mounting means and is engageable with a cylindrical surface of said lip for mounting said mounting body in an exact concentric and radial position.

4. A combination as defined in claim 3 in which the mounting body of said sensor is secured to said nut holding retainer and mounting means by a securing plate and in which the attachment is effected by relative rotational movement between said nut holding retainer and mounting means and said mounting body.

5. In combination with a wheel mounted on bearing means on a shaft whereby the wheel and bearing means may be accurately adjusted and a sensor for sensing the functioning of brake means associated with said wheel, the combination including:
a. a shaft on which said wheel and bearing means are mounted, said shaft having a threaded portion;
b. a nut on said shaft having threads engageable with the threads on said shaft and having an annular recess surrounding said shaft, the outer annular surface of said recess being formed with annularly arranged axial serrations;
c. a nut lock ring positioned in said recess and having means cooperating with said shaft so that said nut lock ring has a fixed circumferential position and in which said lock ring has external circumferentially arranged serrations engageable with the serrations on said nut in the recess thereof whereby said nut may be held in a predetermined rotational and axial position and upon removal of said nut lock ring, said nut may be moved into a different circumferential and axial position and thereafter held in such new position upon replacement of said nut lock ring;
d. a lock ring retainer and mounting ring secured to said nut in a substantially exact circumferential and axial position, said lock ring retainer and mounting ring holding said nut lock ring in said recess and also acting as a mounting means whereby said sensor may be mounted on said nut in exact concentric and axially aligned position; and
e. annular recess and projection means cooperating between said lock ring retainer and said nut and concentrically arranged with respect to the axis of said shaft, said parts cooperating to hold said lock ring retainer and mounting ring in an accurate circumferential and axial position.

* * * * *